United States Patent [19]
Elliott

[11] Patent Number: 6,009,258
[45] Date of Patent: Dec. 28, 1999

[54] METHODS AND DEVICES FOR UNWINDING STACK OF FROZEN PROGRAM AND FOR RESTARTING THE PROGRAM FROM UNWOUND STATE

[75] Inventor: Scott Elliott, Beaverton, Oreg.

[73] Assignee: Symantec Corporation, Cupertino, Calif.

[21] Appl. No.: 08/938,204

[22] Filed: Sep. 26, 1997

[51] Int. Cl.[6] ....................... G06F 11/00
[52] U.S. Cl. ............ 395/500.43; 395/704; 714/15; 714/34; 714/38; 712/227
[58] Field of Search ............ 395/182.12, 182.13, 395/182.14, 182.15, 182.16, 500, 670–678, 569–570, 598, 704; 712/227, 244; 714/15, 34, 38

[56] References Cited

U.S. PATENT DOCUMENTS

| | | | |
|---|---|---|---|
| 5,410,685 | 4/1995 | Banda et al. | 395/575 |
| 5,515,493 | 5/1996 | Boston et al. | 395/157 |
| 5,526,485 | 6/1996 | Brodsky | 395/183.14 |
| 5,581,696 | 12/1996 | Kolawa et al. | 395/183.14 |
| 5,712,971 | 1/1998 | Stanfill et al. | 395/183.1 |
| 5,748,882 | 5/1998 | Huang | 395/184.01 |
| 5,815,702 | 9/1998 | Kannan et al. | 395/591 |
| 5,819,022 | 10/1998 | Bandat | 395/182.14 |

*Primary Examiner*—Kevin J. Teska
*Assistant Examiner*—Russell W. Frejd
*Attorney, Agent, or Firm*—Fliesler, Dubb, Meyer & Lovejoy; Gideon Gimlan

[57] ABSTRACT

StackTrace refers generally here to an apparatus and computer method for use with multitasking operating systems (OS's) such as WINDOWS®95. StackTrace allows a program to again become responsive to OS messages after the program freezes. A user can then save work which was not yet saved at the time the program froze. In one mode, StackTrace identifies a special signature that appears in the virtual stacks of certain kinds of programs. This special signature is a consistently-used return address to a standard-for-type calling function of the OS. StackTrace locates the special signature in the virtual stack of the frozen program and then changes values stored in context registers of the frozen program to cause a return through the in-stack signature location as would have happened if the halted program function had successfully completed. StackTrace then initiates multitasked processing of the program so that the program will return by using the in-stack signature location. This enables the program to become responsive to messages from the OS.

50 Claims, 2 Drawing Sheets

METHODS AND DEVICES FOR UNWINDING STACK OF FROZEN PROGRAM AND FOR RESTARTING THE PROGRAM FROM UNWOUND STATE

BACKGROUND OF THE INVENTION

Cross-Reference To Co-owned Patent Applications

1) Patent application entitled "COMPUTER METHOD AND APPARATUS REQUIRING A ZERO FOOTPRINT IN A PROCESS FOR EXPANDING ALLOCATED MEMORY TO THE PROCESS," Ser. No. 08/823,675, filed on May 29, 1997, inventors Scott Elliott and John D. Teddy, assigned to the same assignee as this patent application, is hereby incorporated by reference in this patent application as if fully set forth in this application.

2) Patent application entitled "COMPUTER METHOD AND APPARATUS FOR UNFREEZING AN APPARENTLY FROZEN APPLICATION PROGRAM BEING EXECUTED UNDER CONTROL OF AN OPERATING SYSTEM", Ser. No. 08/937,629 filed concurrently herewith, inventor Scott Elliott, assigned to the same assignee as this patent application, is hereby incorporated by reference in this patent application as if fully set forth in this application.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to a computer method and apparatus for regaining control over an application program being executed under control of a multitasking operating system after that application program has incurred a fatal error or has otherwise become unresponsive to messages from the operating system.

DESCRIPTION OF THE RELATED ART

There are instances when an application program running under the WINDOWS® 95 or WINDOWS® NT operating systems (trademarks of Microsoft Corp.) ceases to be responsive to messages sent to it from the operating system. When this happens the application program does not respond to user inputs such as keyboard strokes or mouse clicks. To the user the program appears to be unresponsive or frozen. There are other instances when an application program running under the WINDOWS® 95 or WINDOWS® NT operating systems experiences a fatal error which stops the application program. These situations usually results in the user losing all the application program data that was not previously stored to nonvolatile memory.

There are utility programs that allow the user to regain access to an application program that has experienced a fatal error. These utility programs require the insertion of additional instructions into the application program to allow the user to store the application program's data and to exit the application program.

The herein cross referenced patent application entitled "COMPUTER METHOD AND APPARATUS FOR UNFREEZING AN APPARENTLY FROZEN APPLICATION PROGRAM BEING EXECUTED UNDER CONTROL OF AN OPERATING SYSTEM" describes the adding instructions to an application program that is unresponsive to messages from the operating system as one method of regaining access to such a frozen application program.

SUMMARY OF THE INVENTION

It is an object of the present invention to provide a machine-implemented method and apparatus that can cause an application program to become responsive to messages from the operating system after the application program has either (1) become unresponsive to messages from the operating system or has (2) incurred a fatal error, where the method/apparatus provides said function without adding instructions to that application program and where that application program is running under WINDOWS® 95, WINDOWS® NT or like multi-tasking operating systems (OS's).

Briefly the invention provides an apparatus and computer method for controlling the operation of a computer running under an operating system such as WINDOWS®95 or WINDOWS®NT so as to provide user access to an application program that has incurred a fatal error or has become unresponsive to messages from the operating system. A program in accordance with the invention, hereinafter referred to as StackTrace, is stored and installed in a computer for the purpose of controlling the computer to operate in the desired manner.

StackTrace is invoked by another, target-identifying, program that has already identified the target program that is to be unfrozen. When StackTrace is called, StackTrace establishes itself as the debugger for that target (identified) application program. StackTrace determines the return address of a subroutine-invoking service of the OS that is known as the CallWndProc function. StackTrace determines whether the target application program is a Win16 or a Win32 program. StackTrace then determines a size value corresponding to the size of the stack frame associated with either the corresponding 16-bit or 32-bit version of the CallWndProc function that was respectively used by the Win16 or a Win32 target program. StackTrace then saves the respective return-address and frame-size values as CallWndProcRet and CallWndProcSize.

After determining the values of CallWndProcRet and CallWndProcSize, the StackTrace subroutine next walks from a top position on the stack of the target program, back down through the stack by means of a WalkStack routine (described below), looking to identify in the stack the location of a special signature, that signature being the return address of the CallWndProc function. It is assumed that the to-be-unfrozen, target program encountered its problem recently, namely, soon after calling the CallWndProc function. By trying to walk down and find the most recent occurrence from the stack top of the signature of the CallWndProc function in the stack of the target program, StackTrace should be able to identify the place in the execution code of the target program where the target program probably encountered its problem and got stuck. The target program may then be re-started to begin execution at a point where its call to the CallWndProc function completes succesfully. In effect, the re-start pretends that the call made by the CallWndProc function had returned successfully. Another way of looking at the same result is that the re-start pretends that the call through the CallWndProc function to the target function had never gotten stuck and that whatever operations the stuck Window-procedure did not finish doing, can be bypassed to thereby let the frozen program continue its normal operations, in other words, to become unfrozen.

Because the WalkStack process jumps selectively about the stack rather than inching its way through every cell of the stack, sometimes the WalkStack process may fail to find the special signature in the stack of the target program even though the signature is there. If WalkStack is unsuccessful, StackTrace next tries to use another search strategy for finding the special signature. It scans up from the bottom of the stack of the target program, this time inching its way up through every cell of the stack using a ScanStack routine to locate the first occurrence from the stack bottom of the return address for the CallWndProc function.

If either of the ScanStack or WalkStack searches is successful in locating the special signature in the stack of the target program, then StackTrace reestablishes the contents of context registers associated with the target application program such that when multitasked execution of the target application program is restarted the target application program will return back through the CallWndProc function as if the function experiencing the problem (the stuck Window-procedure function) had been completed successfully. This action should provide access to the target application program such that the user may try to save the unsaved data of the application program to nonvolatile memory.

BRIEF DESCRIPTION OF THE DRAWINGS

The invention will be described with respect to particular embodiments thereof and references will be made to the drawings, in which.

DETAILED DESCRIPTION

Figure 1:
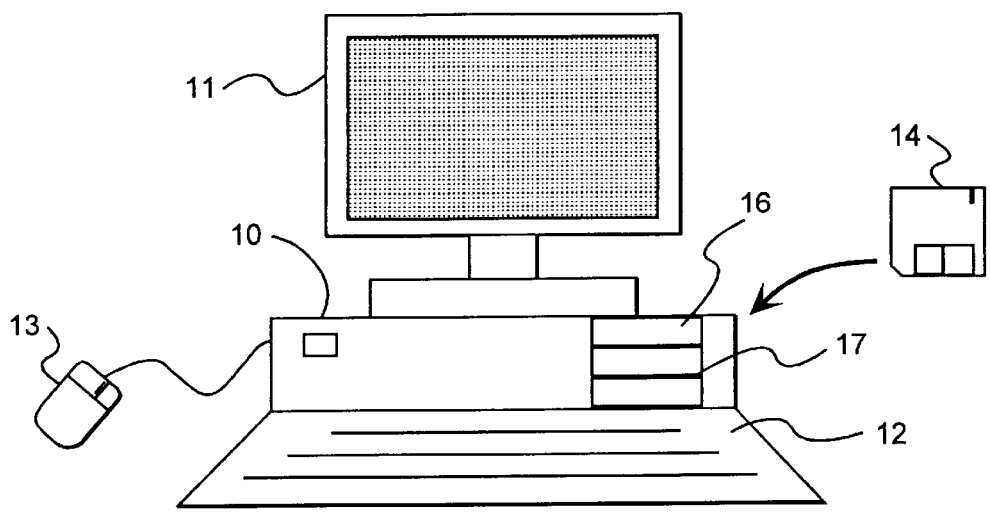
FIG. 1 illustrates a computer system embodying the present invention.
Figure 2:
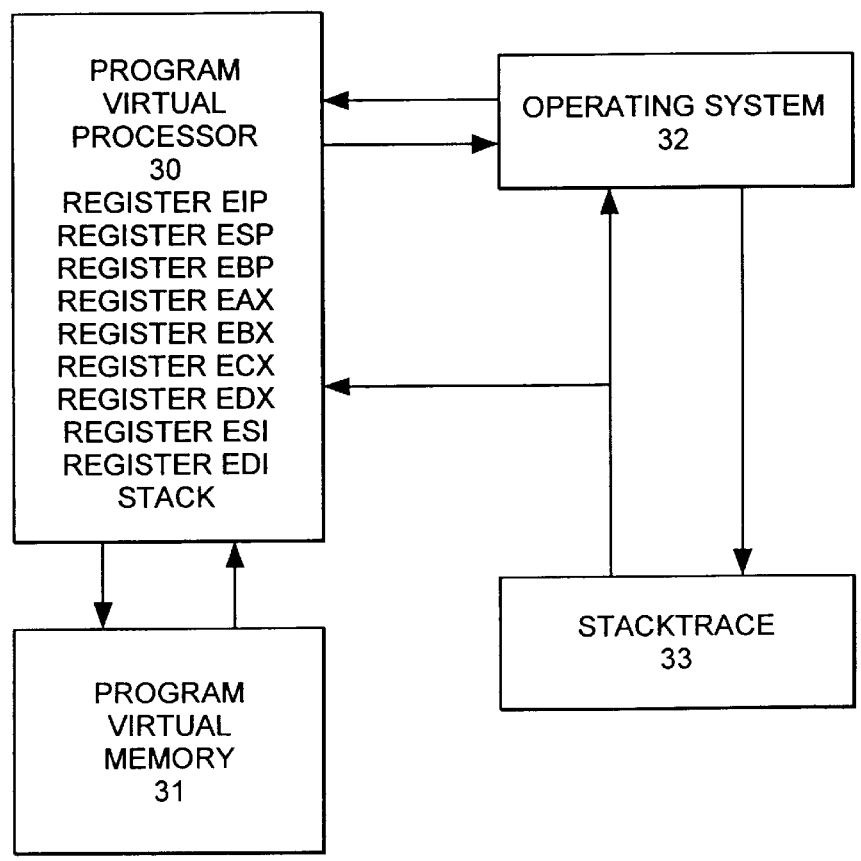
FIG. 2 is an illustration showing the interaction between the operating system, the program's virtual processor and memory and StackTrace.

Referring to FIGS. 1 and 2, a computer system in accordance with the invention is shown comprising a mouse 13, a display 11, a keyboard 12 and a computer 10. Computer 10 includes a floppy disk drive 16, a hard disk drive 17 and a random access memory 15 (not shown in FIG. 1). The computer 10 is operating under the control of WINDOWS®95 or WINDOWS®NT (these are preemptive multitasking OS products of the Microsoft Corp. of Redmond, Wash.) or under control of a like, multitasking operating system 32 (hereinafter referred to as operating system 32). The functions referred to herein are WINDOWS®95 or WINDOWS®NT operating system functions.

Under the architecture of operating system 32, an application program is allocated memory space in memory 15 referred to as a virtual memory 31 Further to allow multitasking of concurrently executing programs, resources are allocated to the application program which are referred to as a virtual processor 30 The virtual processor 30 includes a series of programmable registers, including but not limited to programmable registers commonly referred to as EIP, EBP, ESP, EAX, EBX, ECX, EDX, ESI and EDI. These registers are used by the operating system 32 in carrying out multitasked execution the application program. The state of these programmable registers is commonly referred to as the context of the application program or the program's context. Those skilled in the art know that EIP is an abbreviation for Extended Instruction Pointer, EBP is an abbreviation for Extended Base Pointer, and ESP is an abbreviation for Extended Stack Pointer, these corresponding to nomenclature used under the Intel 80x86 CPU architecture.

An application program running under operating system 32 may become unresponsive to messages from the operating system. When this occurs, the application program is said to be frozen and is unresponsive to keyboard strokes or mouse clicks. A frozen application program can result in the operating system being also non responsive to keyboard strokes or mouse clicks. Further an application program may be stopped by the operating system because a fatal error has been detected by the operating system in the processing of the application program.

In FIG. 1, floppy disk 14 is a magnetic disk widely used in the computer industry to store programs and data. Disk 14 has recorded thereon a program, hereinafter referred to as StackTrace 33. When disk 14 is inserted into floppy disk drive 16, computer 10 has the ability to coact with Stack-Trace 33 stored upon disk 14 so as to control the operation of computer 10. Computer 10 may transfer StackTrace 33 to hard disk drive 17 or into the random access memory (RAM) 15 of computer 10 thereby allowing disk 14 to be removed from the floppy disk drive 16.

While StackTrace 33 was described as recorded upon a floppy disk, StackTrace 33 may be recorded onto any recording medium, i.e, magnetic tape, magnetic cards, optical discs, optical tapes, optical cards, flash memory units, semiconductor memories, that may be used as an input medium to a computer system running under the operating system 32. The process for StackTrace is illustrated in the flow chart of FIG. 3 and will now be described step by step.

STEP 300

Figure 3:
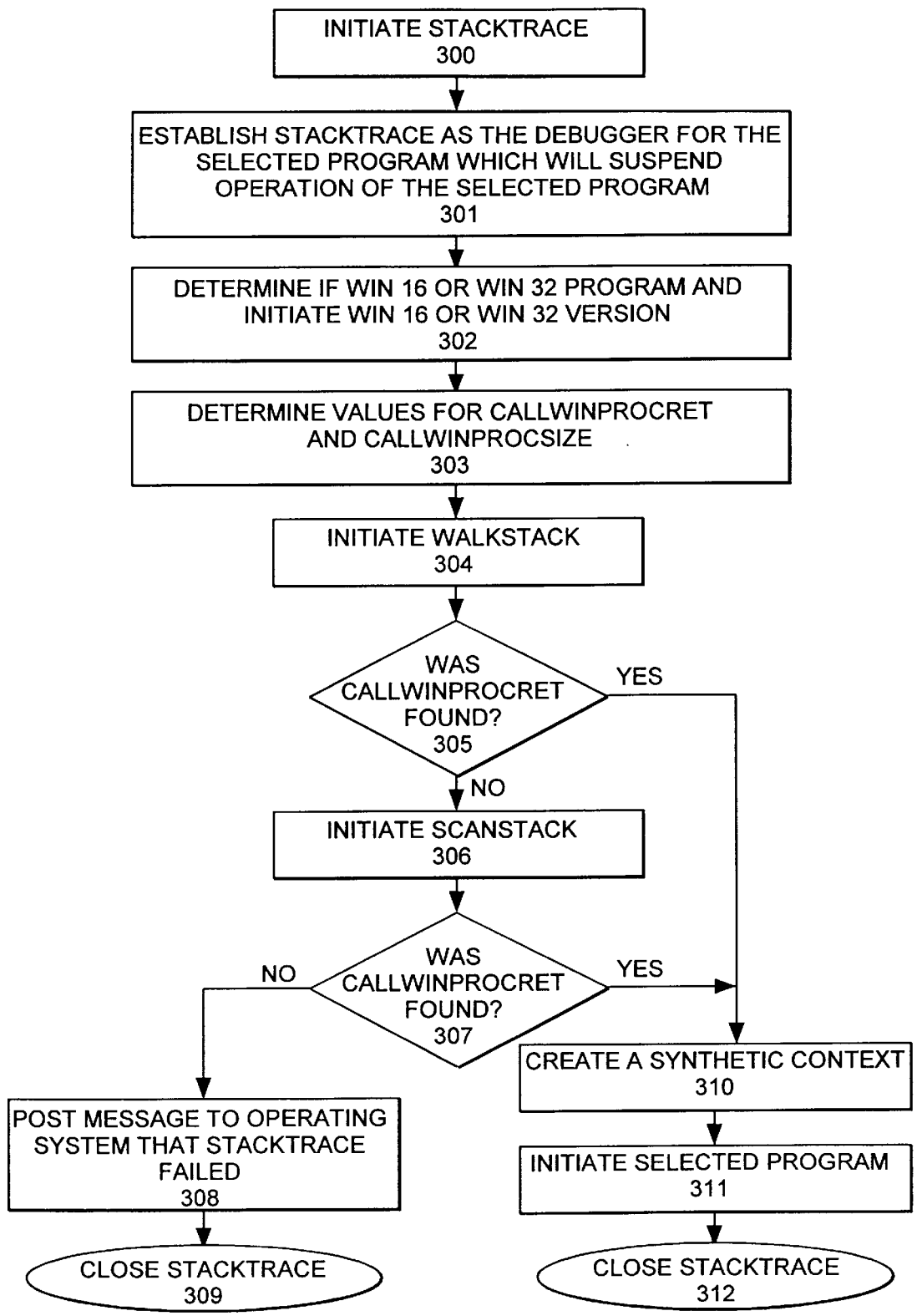
FIG. 3 is a flow chart illustrating the process for Stack-Trace.

Referring to FIG. 3, StackTrace can be called through one of the procedures described in the herein cross referenced applications entitled "COMPUTER METHOD AND APPARATUS REQUIRING A ZERO FOOTPRINT IN A PROCESS FOR EXPANDING ALLOCATED MEMORY TO THE PROCESS" and "COMPUTER METHOD AND APPARATUS FOR UNFREEZING AN APPARENTLY FROZEN APPLICATION PROGRAM BEING EXECUTED UNDER CONTROL OF AN OPERATING SYSTEM." Accordingly, StackTrace starts up as a subroutine that will eventually return to the calling procedure using a return address stored in the virtual stack of the calling procedure. When it starts, StackTrace will know the identity of the selected target program which is to be unfozen, this identity having been passed through from the above calling procedure to StackTrace.

STEP 301

In step 301, StackTrace calls an OS service known as DebugActiveProcess to establish StackTrace as the debugger for the selected target program. By taking on the status of a debugger, StackTrace is able to take control of the selected target program. The selected target program is automatically suspended when the debugger thread is running. It is not necessary to have StackTrace established as the debugger for the selected program in order to perform StackTrace's functions but doing so simplifies the processing of StackTrace's functions.

STEP 302

In step 302, StackTrace determines if the target program is a WIN__16 or a WIN__32 program and then proceeds to respectively initiate either a Win_16 or a Win_32 version of StackTrace from this point on. Various methods for making this determination are known and well understood by those skilled in the art of programming for the WINDOWS®95 and WINDOWS®NT operating systems. For example, the operating system will refuse to provide a 32-bit debugging function if the target program is a Win_16 program. Such refusal may be used to determine that the target program is a Win_16 program instead of a Win_32 program.

BACKGROUND FOR STEP 303

How a Stack Operates During a Function Call

Step 303 relies on certain attributes of stack structuring and conventional post-call procedures which are detailed here. This is an example of how a piece of a program's virtual stack might look when the program decides to place a call to a function which we will call TargetFunc. Arbitrarily assume that the to-be-called, TargetFunc function is a Window-procedure. Such a Window-procedure is a type of function that StackTrace investigates when it traces through the stack of a target program, as will be seen below. For purposes of present understanding, a Window-procedure may be thought of as a sort of "gateway" function, through which all messages that are directed to a particular window will pass. This type of function receives four input parameters: (1) a handle identifying the window to which the message is being sent, (2) an identifier which explains what the message is (for example, the window may be asked to draw itself on the screen), and (3–4) two general purpose parameters which can contain more details about the message (such as describing what region to draw).

Reference is now made to a first depicted state (STATE_0) of an exemplary, virtual stack.

| STACK STATE 0 | |
|---|---|
| 48 | . . . |
| 47 | |
| 46 | |
| 45 | |
| 44 | |
| 43 | |
| 42 | |
| 41 | . . . (SP/ESP points here) |

Assume that a calling program is about to place a call and that program's stack pointer, which pointer is referred to as ESP and is stored in the ESP register, is pointing to cell #41 when the program starts to place the function call. A double-border in the first depicted state (STATE_0) and in later depicted states indicates where ESP is pointing. The actual contents of cell #41 are irrelevant at this point for it is merely the last item which was piled onto the virtual stack of the executing process.

The called subroutine, TargetFunc is a Window-procedure, and as such it requires the four input parameters described above. Before calling TargetFunc, the calling program must push those four parameters onto the stack. To do so, the calling program uses the PUSH instruction to automatically increment ESP to a new stack location and to then store a PUSHed value in that new cell.

The following four depictions of stack states 1–4 show the four parameters being entered into the stack, starting with the 1 and w parameters as shown:

| STACK STATE 1 | |
|---|---|
| 48 | |
| 47 | |
| 46 | |
| 45 | |
| 44 | |
| 43 | |
| 42 | Parameter 4 (lParam) |
| 41 | . . . |

Next:

| STACK STATE 2 | |
|---|---|
| 48 | |
| 47 | |
| 46 | |
| 45 | |
| 44 | |
| 43 | Parameter 3 (wParam) |
| 42 | Parameter 4 (lParam) |
| 41 | . . . |

Next:

| STACK STATE 3 | |
|---|---|
| 48 | |
| 47 | |
| 46 | |
| 45 | |
| 44 | Parameter 2 (Message ID) |
| 43 | Parameter 3 (wParam) |
| 42 | Parameter 4 (lParam) |
| 41 | . . . |

Then:

| STACK STATE 4 | |
|---|---|
| 48 | |
| 47 | |
| 46 | |
| 45 | Parameter 1 (Window Handle) |
| 44 | Parameter 2 (Message ID) |
| 43 | Parameter 3 (wParam) |
| 42 | Parameter 4 (lParam) |
| 41 | . . . |

Now that all the input parameters have been recorded onto the stack, the calling program places a call to the TargetFunc function. The act of calling the TargetFunc function automatically PUSHes a return address onto the stack. The so-PUSHed return address points back to the calling program, telling where the function was called from.

Immediately after the CALL is executed, the stack would have the depicted next state (STATE_5) with ESP pointing at cell #46.

| STACK STATE 5 | |
|---|---|
| 48 | |
| 47 | |
| 46 | Function's Return Address |
| 45 | Parameter 1 (Window Handle) |
| 44 | Parameter 2 (Message ID) |
| 43 | Parameter 3 (wParam) |

-continued

| STACK STATE 5 | |
|---|---|
| 42 | Parameter 4 (lParam) |
| 41 | ... |

It is standard practice in C/C++ and Pascal programs for each called function to declare a stack frame immediately after the CALL to it is made. Assuming that our exemplary TargetFunc follows this convention, as part of this convention the TargetFunc immediately PUSHes the old EBP value stored in register EBP onto the stack. As will become apparent, the old EBP (base pointer) points by convention to an older location of the stack that served as a stack base location for another, older function that was using the stack. Thus a down-pointing, linked list may be formed in the stack by a chain of such EBP-storing cells.

Immediately after the EBP PUSH is executed, the stack has the depicted next state (STATE__6) with ESP pointing at cell #47.

| STACK STATE 6 | |
|---|---|
| 48 | |
| 47 | Stored BP/EBP |
| 46 | Function's Return Address |
| 45 | Parameter 1 (Window Handle) |
| 44 | Parameter 2 (Message ID) |
| 43 | Parameter 3 (wParam) |
| 42 | Parameter 4 (lParam) |
| 41 | ... |

Since the contents of the EBP register has been stored on the stack, the called program (TargetFunc) can now store a new value in the EBP register and later restore the older value from stack cell #47. At this stage, standard programming practice calls for the program (TargetFunc) to copy the ESP value that is currently stored in the ESP register (where the current ESP value is the cell address of the stack cell #47 in which the old EBP value has just been stored) into the EBP register and to then increment the ESP value that is stored in the ESP register by adding a whole number to it. This adding of the whole number causes the stack pointer (ESP) to skip as many entries in the stack as the function wants for its own temporary use. If TargetFunc requires ten entries for its local storage, for example, it will add 10 to ESP so the latter register points at cell #57 (not shown). This reserves cells #48 through #57 as being free for the function's personal use. Since the EBP register currently points to cell #47, that being a stack position which is in between the program's temporary storage area (cells #48–#57) and the input parameters (cells #42–#46) passed to TargetFunc from the calling routine, the system can access these cells by relatively referencing them relative to the current, base address stored in the EBP register. For example, the function's first temporary-storage variable would be stored in cell #(EBP+1) and its first input parameter would be in cell #(EBP−2). Therefore, the function does not have to be compiled with any knowledge of the actual locations where such data is stored on the stack. Rather the function accesses all short-term data by adding to, or subtracting from the stack base address stored in the EBP register.

Because the ESP value in the ESP register now points to cell #57 any additional data pushed onto the stack will start with the next cell after the one indicated by ESP: cell #58. This reserves cells #48 through #57 for the function's use and these reserved cells are referred to as the function's "stack frame". Any further subroutine function that may be CALLed by this function (TargetFunc) is responsible for preserving the values of EBP and ESP for the calling function.

When TargetFunc is done, it is responsible for restoring ESP and EBP registers to the caller's original values. To accomplish this, it copies the EBP register back into ESP register so that ESP again points at cell #47, thereby releasing the function's stack frame. Then it "POPs" the contents of cell #47 back into the EBP register, thereby decrementing the value in the ESP register to point at cell #46.

Immediately after the EBP POP is executed, the stack has the depicted next state (STATE__7).

| STACK STATE 7 | |
|---|---|
| 48 | |
| 47 | |
| 46 | Function's Return Address |
| 45 | Parameter 1 (Window Handle) |
| 44 | Parameter 2 (Message ID) |
| 43 | Parameter 3 (wParam) |
| 42 | Parameter 4 (lParam) |
| 41 | ... |

The EBP register has now been restored to its original value. Since ESP now points to cell #46 which contains the return address, TargetFunc can execute a RET (return) instruction to thereby POP the return address off the stack and allow the system to resume executing at that address. That would, however, leave the four parameter values on the stack. To remove these, the TargetFunc function uses a special variant of the RET instruction which instructs the microprocessor to also pop additional items off the stack before actually performing the return operation. TargetFunc knows it was designed to receive four parameters, so it executes a RET 4 instruction to pop 4 items off the stack in addition to the return address. This causes the microprocessor to first pop cell #46 off the stack, then four additional items, cells #45 through #42, thereby finishing with the ESP value in the ESP register pointing to cell #41 as it started out before TargetFunc was CALLed.

Immediately after the RET 4 instruction is executed, the stack has the depicted next state (STATE__8).

| STACK STATE 8 | |
|---|---|
| 48 | ... |
| 47 | |
| 46 | |
| 45 | |
| 44 | |
| 43 | |
| 42 | |
| 41 | ... (SP/ESP points here) |

This description applies to functions written using the Pascal calling convention, where a function is responsible for cleaning its parameters off the stack even though the calling program put them there. Other calling conventions exist. Those are not relevant to this discussion because Window-procedures must be written using Pascal conventions. StackTrace only deals with calls to Window-procedures, so StackTrace can ignore any other function calls recorded on the stack.

For simplicity, the term "cell" has been used to describe stack entries gas atomic units. In actual practice, each "cell" can be 2 or 4 bytes in size. A 32-bit program uses 4-byte cells and a 16-bit program uses 2-byte cells. If a 16-bit program needs to store 32-bit values, which would require 4-bytes, it merely stores it into 2 adjacent cells. Although this does not materially change the behavior described here, it does alter the numbering scheme, for example, to reserve 10 "cells" on the stack, the TargetFunc function would actually have to increment ESP by 40-bytes if it was written as a 32-bit program.

STEP 303

If StackTrace can identify which stack cell is the one to be used when the CALLed program eventually returns from its Window-procedure, the context of the virtual processor 30 could synthetically be re-created. In the above example, that to-be-used return address is recorded in cell #46.

In designing Windows®95, MicroSoft dictated that a Window-procedure type of function could only be called by having the CALLing program use an OS-provided, standard-for-type, calling function, CallWndProc. Even if a program wanted to directly call its own Window-procedure, it must ask CallWndProc to place the call. Because there is only one piece of code that that is always used to call every Window-procedure, every Window-procedure that is called will consistently return to a same address when it finishes. In other words, cell #46 must cause a return to the Call-WndProc function because TargetFunc is a Window-procedure that was invoked by way of the system's Call-WndProc function.

If StackTrace can discover what the value is of such a return address, even if the latter is used by only one particular Window-procedure call, then StackTrace will thereby know the value of such return address for every Window-procedure call of the given system because all Window-procedure calls of a given system reference the system's CallWndProc function.

To determine the value of this address, the first action taken by StackTrace after it itself has been invoked is to itself invoke a Window-procedure. The first action taken by this invoked Window-procedure, upon being called, is to immediately look at its own stack and ascertain the return address for the CallWndProc function that invoked Stack-Trace's first Window-procedure. StackTrace then records the value as CallWndProcRet. StackTrace also determines a value corresponding to the size of CallWndProc's stack frame and records that value as CallWndProcSize for later use.

The arithmetic used in these algorithms may be a bit confusing because, under Intel-type microprocessors, the bottom of the program's stack is stored at a higher address than the top. Consequently, a program's stack starts at a high memory address and decrements by four for each storage cell (each cell occupies four bytes). Despite the backward numbering scheme, decreasing addresses are still referred to as "up" and the lowest address is still "the top" of the stack.

When StackTrace first begins executing, StackTrace immediately creates a window. If the target program is a 32_bit program, the Window-procedure associated with this window immediately executes the following statements to record information about the system in which StackTrace is executing:

```
{
    DWORD     dwCallWndProcRet;
    DWORD     dwStackFrameSize;
    // get the return address
    _asm
```

```
    {
        mov     eax, [ebp+4]            ; Get return address
                                        ;   from stack
        mov     dwCallWndProcRet,eax    ; Store it
        mov     eax, [ebp]              ; Get the prior
                                        ;   value of EBP
        lea     ebx, [ebp+4]            ; Get location of
                                        ;   return address
        sub     eax,ebx                 ; Calculate the
                                        ;   difference
        mov     dwStackFrameSize,eax    ; Store it as the
                                        ;   stack frame size
    }
    // store it
    g_JitData.dwWndProcRet = dwCallWndProcRet;
    g_JitData.dwStackFrameSize = dwStackFrameSize;
}
```

This excerpt, written partly in assembler, looks back on the stack to find out where it was called from and saves this value in the dwCallWndProcRet variable. As discussed earlier, all 32-bit Window-procedures in the system get called the same way, so they will all return to the same address. The code then calculates the distance between the stack cell which stores dwCallWndProcRet and the stack cell which contains the EBP value for a next-lower stack frame. This calculated distance is later used to determine how far a below-described WalkStack routine will have to look back up the stack during a below-described "overshoot and look back up" procedure. The above assembly excerpt concludes by copying the results into a global data structure called g_JitData.

A routine for the 16-bit version is somewhat different. Here to obtain the value for CallWndProcRet, the above program is modified to call the 16-bit CallWndProc function and to obtain the seventh address from the bottom of that function which should contain the proper address corresponding to 174F:2E7F and the size of the stack is determined in a similar manner.

Under Windows®95 there are two distinct incarnations of the CallWndProc function, one for 32-bit programs and another for older 16-bit programs. It has been determined (see below step 310) that at present the value of CallWndProcRet is BFF73633 for 32-bit programs and may be 174F:2E7F for 16-bit programs. These absolute values should be used with caution. In the preferred embodiment, these values are always obtained such that StackTrace is certain that it has the correct value for CallWndProcRet regardless of whether StackTrace is being used with Windows®95 or with Windows®NT.

STEP 304

In step 304, the virtual stack of the target program is searched by the WalkStack routine for the location of the special signature. In walking down through the selected program's stack, WalkStack works backwards from the selected target program's current state to find the most recent location where a Window-procedure of the target program was called. It does this by working backward, jumping from one to the next of the program's stack frames. Although standard practice in debugging tools, such walking upon stack frames or frame-tracing is considered an extremely advanced skill. In standard practice, however, the information collected from frame-tracing is only useful if the target program was compiled to share special knowledge of its internal structure with the debugger. If frame-tracing is applied to an arbitrary program that is merely taken out-ofthe-box, the frame-trace can reveal where a program's stack frames are located, but nothing certain about their contents.

Referring to for example, the above STACK STATE 6 and the standard steps taken thereafter, it can be seen that after the value of the ESP register for a CALLed program is stored in the EBP register of the virtual processor for that program, the value of the program's EBP register points generally to the end of its current stack frame (that is, to cell #47 which is just below the bottom-most cell #48 of the stack frame). Also (as in the example), the value stored in the stack from the EBP register (e.g, the value in cell #47) also points to the cell which records the previous stack frame's EBP value, that is the stack frame used by the calling function and to which EBP would be restored when returning to the caller. That EBP value, in turn, will point to the cell which records the previous value of EBP, and so on in a continuous chain. Thus, a downward-directed, linked list is defined. As long as the chain is unbroken, WalkStack can walk backward in precise, frame-tracing steps through all the outstanding stack frames by using this chain of EBP values.

One straight-forward way in which WalkStack could identify the cell containing the special signature that it is looking for, namely, the return address for the CallWndProc function is to look in the cell (e.g, #46) immediately adjacent to the cell (e.g, #47) that stores the walked-on EBP value to see if the address of CallWndProcRet is stored there. In the example of STACK STATE 6, the old value of the EBP register is stored in cell #47, and the return address to the CALLing routine is stored in the immediately adjacent cell #46. This is extremely common, since most functions declare a stack frame immediately after being called, thereby recording EBP in the next cell after the one holding their caller's return address. This immediate nexus of the EBP-holding cell (e.g, #47) and the Return-holding cell (e.g, #46) is not guaranteed, however, since the programmer or compiler might have decided to store other items on the stack before declaring a stack frame (which declaring includes PUSHing EBP onto the stack and reserving additional stack area for storage of local variables). Nevertheless, this straight-forward technique would be adequate in most situations.

However, the preferred embodiment of WalkStack uses an indirect technique instead of the straight-forward technique for determining the location of the cell that may store the the address of CallWndProcRet. WalkStack avoids making the simple-minded assumption that the Return-holding cell is immediately below the EBP-holding cell. Instead of looking at the cell immediately below the current, EBP-holding cell, WalkStack jumps beyond, to the next-lower EBP-holding cell. In other words, WalkStack deliberately overshoots the EBP-holding cell of the stack frame it is currently investigating and instead points to the EBP-holding cell of the next lower (previous) stack frame. After deliberately overshooting the address of the current frame's EBP-holding cell and instead pointing to the next lower EBP, WalkStack looks upward by a known distance to see if it thereby overshot a Return-holding cell. Because StackTrace initially recorded a value representing the size of CallWndProc's stack frame as CallWndProcSize, it knows the length of every CallWnd-Proc stack frame. WalkStack can point up by that amount and further up by the known length of the input parameters area to see if it can find a cell storing the special signature value, namely, CallWndProcRet.

Consider the stack shown below as STACK STATE_A wherein the EBP of cell #47 points to cell #38 and the latter stores an EBP of an earlier frame:

| STACK STATE A | |
|---|---|
| 48 | ... |
| 47 | Previous EBP (points to cell#38) |
| 46 | "CallWndProcRet" return address |
| 45 | Parameter 1 (Window Handle) |
| 44 | Parameter 2 (Message ID) |
| 43 | Parameter 3 (wParam) |
| 42 | Parameter 4 (lParam) |
| 41 | Stack Frame Cell #3 |
| 40 | Stack Frame Cell #2 |
| 39 | Stack Frame Cell #1 |
| 38 | Previous EBP |

As already explained, in order to locate the cell of STACK STATE A that holds the CallWndProcRet address by way of the straight-forward technique, WalkStack could have walked the chain of EBP values and checked the immediately adjacent cells for the CallWndProcRet value, which it would find in cell #46 when it had traced down to cell #47. If the special return address was not stored in the cell (e.g, #46) immediately adjacent to the cell (e.g, #47) that stores the walked-on EBP value, this straight-forward method would not work. To solve this problem, WalkStack overshoots the current EBP-holding cell (#47), points to the next lower EBP-holding cell (#38), and then looks back up the stack for the CallWndProcRet value associated with the next lower EBP-holding cell (#38). In this example, it would have to walk a little further using the EBP value of cell #47 which points to cell #38.

In doing this test, StackTrace remembers that its next current location will be cell #38. If the test fails, StackTrace will continue its search from that cell #38, not from the cell #47 whose frame contents it was just examining as part of the signature-finding test. To perform the test, StackTrace counts up the stack from cell #38, skipping the three cells (#39, #40, #41) it previously determined would be in the CallWndProc's stack frame, plus the four cells (#42, #43, #44, #45) containing the input parameters that the CallWnd-Proc would have pushed onto the stack for the called function in the called function's stack, thereby getting to and examining cell #46 without relying in this example on there being an immediate nexus between the higher EBP-holding cell (e.g, #47) and the Return-holding cell (e.g, #46).

If the stack frame being so-examined belongs to the function called by CallWndProc, the cell being examined will contain the special value of CallWinProcRet, as its does in cell #46 in this example.

Here is the reason why. If cells #39–#41 are truly the stack frame of the standard CallWndProc function, then cell #38 would hold the EBP value that CallWndProc pushed when it declared its stack frame (#38–#41). Cells #42–#45 would then be the ones consumed by the standard CallWndProc function as it pushed the 4 input parameters onto the stack in preparation for calling the target, Window-procedure. Cell #46 would then be the one consumed by the standard CallWndProc function as it CALLed the target, Window-procedure and as a result, the return address back to the next instruction inside the standard CallWndProc function was automatically pushed onto the stack. Cell #47 may or may not then hold the EBP value that the target, Window-procedure pushed when it declared its stack frame (e.g, #48–#57). Generally it does if the target, Window-procedure follows the standard practice in C/C++ and Pascal programs.

If the stack frame under investigation is not that of the process which occurs when a Window-procedure function is called by CallWndProc, then StackTrace will not find the value of CallWinProcRet in that particular cell #46. Walk-Stack will then continue to walk through the stack from cell #38 searching for the value of CallWinProcRet in each subsequent stack frame that is tested.

When StackTrace initially located and recorded the value of CallWndProcRet for its later use, it also measured the distance from CallWndProcRet's position to the location of the EBP-holding cell of the previous or next lower stack frame and named this value CallWndProcSize. WalkStack therefore needs only to subtract the CallWndProcSize from the EBP value stored in the stack to ascertain the higher-up on the stack address of the cell storing the CallWndProcRet value regardless of the location of CallWndProcRet with reference to the location of EBP in the stack frame.

The WalkStack routine uses a function called JITDEBUG_Find_CallWndProcRet which contains the following C-language statements:

```
DWORD WINAPI JITDEBUG_Find_CallWndProcRet
(
    const HANDLE    hProcess,
    const DWORD     dwCurrentEBP,
    const DWORD     dwBottomOfStack
)
{
    DWORD           dwResult = 0
    DWORD           dwStackItem;
    DWORD           dwNewEBP = 0;
    // Start from current value of EBP
    dwStackItem = dwCurrentEBP;
    // Keep searching until we find a result, or we run
        out of stack
    while (!dwResult && dwStackItem > dwNewEBP &&
        dwStackItem < dwBottomOfStack)
    {
    // Current stack item contents become EBP
    dwNewEBP = dwStackItem;
    // Look to see if we've passed the CallWndProc return
        address.
    if (!ReadProcessMemory( g_JitData.hProcess,
        (LPCVOID) (dwNewEBP - g_JitData.dwStackFrameSize),
        (LPVOID) &dwStackItem, size of (dwStackItem, NULL
        ))
            return (0);
    // Is it a match?
    if (dwStackItem == g_JitData.dwCallWndProcRet)
    {
        // We've apparently located the return address to
            CallWndProc
        dwResult = dwNewEBP - g_JitData.dwStackFrameSize;
    }
    else
    {
        // Read the EBP value of the next stack frame
        if (!ReadProcessMemory( g_JitData.hProcess,
            (LPCVOID) dwNewEBP, (LPVOID) &dwStackItem,
            sizeof(dwStackItem), NULL ))
                return (0);
    }
    };
    return (dwResult);
}
```

As seen from the above C-langauage code, the WalkStack routine requires the following input parameters: (1) the selected program's process handle, (2) the value of the selected program's EBP register at the time the selected program became unresponsive or suffered the fatal error, and (3) the location of the bottom of the selected program's stack to prevent WalkStack from running off the bottom of the selected program's stack if WalkStack cannot find CallWndProcRet.

WalkStack function starts at the stack cell identified by the EBP register of the frozen, target program. WalkStack then immediately looks upward (toward the "top") on the stack to see if it has overshot the CallWndProcRet value, which of course it has not yet because it has not gone anywhere yet. Since it has not found CallWndProcRet, the function then reads the contents out of the stack cell indicated by the EBP register, which identifies another stack frame farther down the stack (toward the "bottom"). It repeats its check for CallWndProcRet and continues advancing down the stack until it either locates an appropriately-positioned cell containing CallWndProcRet or runs out of the stack. WalkStack also quits if, for some reason, any of the links lead toward the top of the stack which is an illegal condition for the downwardly pointing chain of EBP values.

When the WalkStack succeeds, WalkStack returns a value identifying which stack cell contains CallWndProcRet. WalkStack is the same for a WIN_16 and a WIN_32 program.

STEP 305

If WalkStack could not locate CallWndProcRet because, for example, the chain of stack frames was broken, StackTrace next employs in Step 306 a ScanStack routine to search for CallWndProcRet. If WalkStack could locate CallWndProcRet, StackTrace creates a synthetic context for the selected program in Step 310.

STEP 306

ScanStack searches sequentially through the stack for the return value, working up from the bottom of the stack. Because ScanStack searches upward from the beginning of the stack, ScanStack will find the first occurrence of the CallWndProcRet value, rather than the most recent. Frequently there is only one occurrence, so this yields the same result as WalkStack would have if the chain of EBP's had not been broken.

However, a window-procedure may have done something which caused it to be called again before it was finished (a re-entrant call), so there may be two or more outstanding occurrences of CallWndProcRet. StackTrace would prefer to use the most recent occurrence but only the earliest occurrence can be certified as authentic by the ScanStack method. If the more recent occurrence is not authentic, the program will suffer irreparable damage if StackTrace uses it. A non-authentic or decoy occurrence may remain in the stack because the computer does not erase the stack memory when it is done using it. Each decoy started as an authentic return address, but it was left in the stack memory after its window-procedure function returned.

An example of a re-entrantly called window-procedure is one for servicing user clicking on a pushbutton. Such a window-procedure would get called re-entrantly, for example, when the user clicks on a displayed pushbutton with the mouse. The system calls the window-procedure with a message telling it the user has clicked the mouse, so the window-procedure changes the appearance of the pushbutton to look depressed. That change could cause the window-procedure to implicitly call itself (via CallwndProc as usual) with a message asking it to redraw in the depressed state.

ScanStack works in the other direction from that of WalkStack, starting from the bottom of the stack and working toward the top until it finds CallWndProcRet.

ScanStack executes the following statements:

```
(
    const HANDLE    hProcess,
    const DWORD     dwCurrentESP,
    const DWORD     dwBottomOfStack
)
{
    DWORD       dwResult = 0;
    DWORD       adwBlock[64];
    UINT        iBlock
    // ignore first entry in first "block"
    iBlock= 0;
    while (!dwResult && dwBottom > dwCurrentSp)
    {
        // move to previous entry (if any)
        if (iBlock)
            iBlock--;
        else
        {
            // no previous entry, so load a set of 64
            // entries
            dwBottom -= sizeof(adwBlock);
            if (!ReadProcessMemory( g__JitData.hProcess,
            (LPCVOID)dwBottom, (LPVOID)adwBlock,
            sizeof(adwBlock), NULL ))
                return (0);
            // start at last entry in current block
            iBlock = 63;
        }
        // is the dispatch-function's return address
        // in there?
        if (adwBlock [iBlock] == g__JitData.dwCallWndProcRet)
            dwResult = dwBottom + (4 * iBlock);
    }
    return (dwResult);
}
```

ScanStack reads 64 stack cells at a time into a temporary buffer and searches through it such that the Windows®' ReadProcessMemory function need not be called repeatedly to retrieve every single cell. ScanStack effectively starts at the bottom of the selected program's stack and searches each cell until it either finds CallWndProcRet or runs into the top of the stack, which is identified by the address in the selected program's ESP register.

When the ScanStack succeeds, ScanStack returns a value identifying which stack cell contains CallWndProcRet. ScanStack is the same for a WIN_16 and a WIN_32 program

STEP 307

If ScanStack could not locate CallWndProcRet because the chain of stack frames was broken, StackTrace branches to step 308. If ScanStack could locate CallWndProcRet, StackTrace creates a synthetic context for the selected target program in Step 310.

STEP 308

If StackTrace is unable to locate CallWndProcRet, it can post a message to the user to indicate that StackTrace has failed. This step is not needed where StackTrace is embedded within a utility program that will then initiate other routines to gain access to the failed application program.

STEP 309

Having failed in its search for the CallWndProcRet signature, StackTrace will end and leave the selected application program in the same state as the application program was in prior to StackTrace being initiated.

STEP 310

Upon successfully discovering where CallWndProcRet resides on the program's stack, StackTrace adjusts the selected program's context (registers) to simulate the environment into which the selected target program would have eventually continued had the selected program not became unresponsive.

To do so, StackTrace must set the registers of the selected program so that the next instruction to be executed will be a RETURN using the value of CallWndProcRet.

When a 32-bit program calls for a Window-procedure under Window®95, it delegates the job to the CallWndProc function located at linear addresses BFF73625-BFF7366E. The following is a listing of that section of the system's memory:

| Address | Instruction | Operands |
|---|---|---|
| BFF73625 | PUSH | EBP |
| BFF73626 | MOV | EBP,ESP |
| BFF73628 | PUSH | ESI |
| BFF73629 | PUSH | EDI |
| BFF7362A | MOV | GS,[EBP+0A] |
| BFF7362E | MOVZX | ESI,WORD PTR [EBP+08] |
| BFF73632 | MOV | ECX,GS: [ESI] |
| BFF73635 | AND | ECX,7FFFFFFF |
| BFF7363B | JZ | BFF73655 |
| BFF7363D | MOV | EAX,[EBP+10] |
| BFF73640 | TEST | EAX,EAX |
| BFF73642 | JNZ | BFF73687 |
| BFF73644 | LEA | EDX,[ESI+0C] |
| BFF73647 | SHR | DWORD PTR GS:[ESI+04],1 |
| BFF7364B | JB | BFF7366F |
| BFF7364D | PUSH | DWORD PTR GS:[EDX] |
| BFF73650 | LEA | EDX,[EDX+04] |
| BFF73653 | LOOP | BFF73647 |
| BFF73655 | MOV | EDI,ESP |
| BFF73657 | XOR | EAX,EAX |
| BFF73659 | CMP | GS:[ESI+08],EAX |
| BFF7365D | JZ | BFF73663 |
| BFF7365F | CALL | GS:[ESI+08]  ; This is the actual ; call to the window-proc |
| BFF73663 | MOV | ESP,EDI   ; This is where it ; returns to |
| BFF73665 | XOR | ECX,ECX |
| BFF73667 | MOV | GS,CX |
| BFF73669 | POP | EDI |
| BFF7366A | POP | ESI |
| BFF7366B | LEAVE | |
| BFF7366C | RET | 000C |

Since StackTrace is only interested in the function's behavior at the time it calls a Window-procedure, StackTrace can ignore most of the code. The above code reveals that the CallWndProc function will return to line BFF73663 when the Window-procedure finishes, so StackTrace needs only to be concerned with the behavior of the CallWndProc function from that line onward to see what the function does with the EDI and ESI registers. Line BFF73663 moves the contents of the EDI register into the ESP register (it had previously saved the ESP register into the EDI register at line BFF73655). It may be determined therfore that EDI must contain the desired value for the ESP register. Neither the EDI nor ESI register is used again until, at lines BFF73669 and BFF7366A, the values for the EDI and ESI registers get popped from the stack, thereby restoring the original values for the EDI and the ESI registers which were saved at lines BFF73628 and BFF73629.

The ESP register is extremely critical because it controls the program's use of its stack. Therefore, StackTrace must set the ESP register so that the CallWndProc function can properly return to whomever called it. As discussed before, when a Window-procedure function is returned, the ESP register for the selected program points to CallWndProcRet and is decremented as the system pops the CallWndProcRet cell and the four cells following it off the stack. Since StackTrace has determined the address of the cell which contains CallWndProcRet, StackTrace calculates the value for the ESP register by subtracting five cells from the cell address that contains CallWndProcRet.

The value of the EBP register, likewise, is critical because it controls CallWndProc's access to its own storage, as well as pointing to the value of the previous stack frame. Stack-Trace derives the value for the EBP register by adding the value of CallWndProcSize to the value calculated for the ESP register above.

CallWndProc expects the window-procedure to return a result value in the EAX register, but since CallWndProc does not examine the result code but merely records it, it is not critical what value StackTrace places there.

As noted above, CallWndProc expected the EDI register to be preserved. StackTrace copies the value calculated for the ESP register above into the EDI register.

The value in the ESI register is not used after a return to CallWndProc. Therefore, StackTrace does not have to put any special value in the ESI register.

To obtain the foregoing, StackTrace performs the following operations as indicated by C-langauge statements:

```
Return_To_CallWndProc
(
    const HANDLE    hThread,
    const DWORD     dwStackCellOfCallWndProcRet
)
{
    CONTEXT     cntx;
    // Get current program registers
    GetThreadContext( hThread, &cntx );
    // Adjust the execution context
    cntx.Esp = dwStackCellOfCallWndProcRet;
    cntx.Ebp = dwStackCellOfCallWndProcRet +
        g_JitData.dwStackFrameSize;
    cntx.Edi = cntx.Esp + 4;
    // Simulate the action a RET 10 would cause
    cntx. Eip = g_JitData.dwCallWndProcRet;
    cntx.Esp += 4 + 16;
    // Resume the program at the new context
    SetThreadContext ( hThread, &cntx );
}
```

To execute the above Return_To_CallWndProc function, StackTrace passes to this function a handle to the selected program's thread, so StackTrace can examine and modify the selected program's registers, and the location of the stack cell which contains CallWndProcRet. The function retrieves the selected program's current register settings and sets them to the values they would have contained immediately after the program's called Window-procedure had returned normally. The EIP (instruction pointer) register identifies the next instruction to execute, which will be at the location pointed to by CallWndProcRet, where the latter value is retrieved from g_JitData.dwCallWndProcRet of the above code. The stack pointers point to the stack frame used by CallWndProc.

The CallWndProc function for a 16-bit program was found to reside at 174F:2E2E through 174F:2E8D. It should be noted that registers for a 32 bit program are designated by Exx and for a 16 bit program as xx without the preceding E. Although the function's actual location in memory may vary from one session to the next, the actual code for the 16 bit version will always read as follows:

| 174F:2E2E | ENTER | 000A,00 | |
|---|---|---|---|
| 174F:2E32 | MOV | ECX,[BP+0E] | |
| 174F:2E36 | MOV | AX,[ECX+46] | |
| 174F:2E3A | MOV | [BP–08],AX | |
| 174F:2E3D | MOV | EAX,[ECX+5C] | |
| 174F:2E42 | MOV | [BP–06],EAX | |
| 174F:2E46 | MOV | AL,[ECX+38] | |
| 174F:2E4A | AND | AX,0004 | |
| 174F:2E4D | MOV | [BP–0A),AX | |
| 174F:2E50 | PUSH | ESI | |
| 174F:2E52 | PUSH | EDI | |
| 174F:2E54 | PUSH | DS | |
| 174F:2E55 | MOV | AX,SS | |
| 174F:2E57 | MOV | DS,AX | |
| 174F:2E59 | MOV | ES,AX | |
| 174F:2E5B | CMP | WORD PTR [BP–0A],00 | |
| 174F:2E5F | JZ | 2E71 | |
| 174F:2E61 | PUSH | WORD PTR [BP–08) | |
| 174F:2E64 | PUSH | DWORD PTR [BP+0A) | |
| 174F:2E68 | PUSH | DWORD PTR [BP+06] | |
| 174F:2E6C | PUSH | WORD PTR [BP+04] | |
| 174F:2E6F | JMP | 2E7C | |
| 174F:2E71 | PUSH | WORD PTR [BP–08] | |
| 174F:2E74 | PUSH | DWORD PTR [BP+0A] | |
| 174F:2E78 | PUSH | DWORD PTR [BP+06] | |
| 174F:2E7C | CALL | FAR [BP–06] | ; This line ;calls the window-procedure |
| 174F:2E7F | MOV | [BP–02],AX | ; . . . and ; it returns here |
| 174F:2E82 | POP | DS | |
| 174F:2E83 | POP | EDI | |
| 174F:2E85 | POP | ESI | |
| 174F:2E87 | MOV | AX,[BP–02] | |
| 174F:2E8A | LEAVE | | |
| 174F:2E8B | RET | 000E | |

Since StackTrace is only interested in the function's behavior at the time it calls a Window-procedure, Stack-Trace can ignore most of the code. The above code reveals that the the 16 bit version of the CallWndProc function will return to line 174F:2E7F when the Window-procedure finishes, so StackTrace needs only to be concerned with the function from that line onward to see what the function does with the DI and SI registers. Neither the DI nor SI register is used again until, at lines 174F:2E83 and 174F:2E85, where the values for the DI and SI registers get popped from the stack, restoring the original value for the DI and the SI registers which were saved at lines 174F:2E50 and 174F:2E52.

The ESP register is extremely critical because it controls the program's use of its stack. Therefore, StackTrace must set the ESP register so that the CallWndProc function can return to whomever called it. As discussed before, when a Window-procedure function is returned, the ESP register for the selected program points to CallWndProcRet and is decremented as the system pops the CallWndProcRet cell and the following four cells off the stack. Since StackTrace has determined the address of the cell which contains CallWndProcRet, StackTrace calculates the value for the ESP register by subtracting five cells from the cell address that contains CallWndProcRet.

The value of the BP register, likewise, is critical because it controls CallWndProc's access to its own storage, as well as pointing to the value of the previous stack frame. Stack-Trace derives the value for the BP register by adding the value of CallWndProcSize to the value calculated for the SP register above.

CallWndProc expects the Window-procedure to return a result value in the AX register, but since CallWndProc does not examine the result code but merely records it, it is not critical what value StackTrace places there.

The value in the ESI and EDI registers are not used after a return to CallWndProc. Therefore, StackTrace does not have to put any special value in the SI or the DI registers.

STEP 311

After having restored the context of the frozen, target program StackTrace can restart multitasked execution of the selected program by calling ContinueDebugEvent. The selected program will resume from within the CallWndProc function exactly as it would have if the program's Window-procedure had finished what it was doing and returned normally.

STEP 312

StackTrace will now close.

While the above description teaches a preferred sequence of execution of the different routines comprising StackTrace, various other sequences of execution of the different routines will also obtain the desired results. Although specific implementations for each routine have been set forth, given the above it is well within the skill of the artisan in the art to generate other routines that perform the same function to obtain the same results. For example, the order of performing ScanStack and WalkStack may be reversed or one or the other may be deleted entirely.

While the invention has been particularly shown and described with references to the preferred embodiments thereof, it will be understood by those skilled in the art that changes in form and detail may be made therein without departing from the spirit and scope of the invention. Given the above disclosure of general concepts and specific embodiments, the scope of the protection sought is defined by the following.

What is claimed is:

1. An instructing apparatus operatively couplable to a data processing machine operating under control of Windows®95 or Windows®NT or another multitasking operating system that provides a virtual stack for each multitasked application program and further maintains a plurality of context registers for each such multitasked application program, said instructing apparatus being for enabling a frozen application program to become responsive to messages from said operating system after a window procedure function of said application program has become stuck and has thereby caused the application program to become unresponsive to messages sent to the frozen program from said operating system, wherein said operating system requires the invocation by an executing application program of a standard calling function for calling window procedures when the executing application program is to invoke a window procedure; said instructing apparatus comprising:

(a) first instruction means for instructing said data processing machine to stop said frozen application program if said application program is not yet stopped;

(b) second instruction means for instructing said data processing machine to obtain and store a value of a special return address associated with each return from a called window procedure to said standard calling function;

(c) third instruction means for instructing said data processing machine to identify a location where said value for said special return address is stored in a corresponding virtual stack for said frozen application program, said identified location being displaced relative to a base-storing location of a corresponding stack frame;

(d) fourth instruction means for instructing said data processing machine to store new values into a subset of the context registers of said frozen application program, said new values being equal to values that would have been contained in said subset of context registers had said stuck, window procedure function been successfully completed; and (e) fifth instruction means for instructing said data processing machine to initiate a continuation of processing of said standard calling function as invoked by the invocation of said frozen application program of the window-procedure function such that said window-procedure function will appear to be normally returning by way of said special return address.

2. The apparatus of claim 1 wherein said first instruction means instructs said data processing machine to establish a StackTrace process as a debugger for said frozen application program such when said debugger is established, execution of said frozen application program will be automatically stopped if it had not already stopped.

3. The apparatus of claim 1 further comprising:

(f) sixth instruction means for further instructing said data processing machine to determine whether said frozen application program is a 32 bit program or a 16 bit program.

4. The apparatus of claim 1 wherein said third instruction means instructs said data processing machine to use a stack walking process to identify a stack frame in said stack, where the identified stack frame contains said special value of said return address, wherein the stack walking process moves through a chain of EBP-holding cells defined in said stack of the frozen application program.

5. The apparatus of claim 1 wherein said third instruction means instructs said data processing machine to use a stack scanning process to identify a stack frame in said stack, where the identified stack frame contains said special value of said return address, wherein the stack scanning process moves through sequential cells of said stack of the frozen application program.

6. The apparatus of claim 4 wherein:

said third instruction means first instructs said data processing machine to locate a stack frame in said stack which contains said special return address by using said stack walking process; and if said process of walking through said stack does not locate a frame in said stack that contains said special return address, then said third instruction means instructs said data processing machine to use a stack scanning process to secondly identify a stack frame in said stack, where the secondly identified stack frame contains said special value of said return address, wherein the stack scanning process moves through sequential cells of said stack of the frozen application program.

7. The apparatus of one of claims 4 and 6 wherein said second instruction means further instructs said data processing machine to determine a size value where said size value defines a relative distance in said stack between a first stack cell representing a start of a stack frame declared by the standard calling function and a second stack cell in said stack that contains said special return address.

8. A machine-implemented method for controlling a data processing machine operating under control of Windows®95 or Windows®NT or another multitasking operating system that provides a virtual stack for each multitasked application program and further maintains a plurality of context registers for each such multitasked application program, said method having the capability to enable a frozen application program to become responsive to messages from said operating system after a window procedure function of said application program has become stuck and has thereby caused the application program to become unresponsive to messages sent to the frozen program from said operating system, wherein said operating system requires the invocation by an executing application program of a standard calling function for calling window procedures when the executing application program is to invoke a window procedure; said machine-implemented method comprising the steps of:

(a) stopping said program if said program is not yet stopped;

(b) obtaining a special return address associated with each return from a called window procedure to said standard calling function;

(c) finding a storage location of said special return address in the corresponding virtual stack for said frozen program;

(d) changing values stored in a subset of the context registers of said frozen application program to new values, were said new values are equal to values that would have been contained in said subset of context registers had said stuck, window procedure function been successfully completed;

(f) initiating a continuation of the processing of said standard calling function for the frozen application program such that execution associated with said program will immediately return to a location specified by said special return address.

9. The machine-implemented method of claim 8 wherein said stopping step (a) establishes a StackTrace process as a debugger for said frozen application program such that when said debugger is established said frozen application program will be stopped if the program had not yet stopped.

10. The machine-implemented method of claim 8 further comprising before said obtaining step (b) the additional step of:

(g) determining whether said frozen application program is a 32 bit program or a 16 bit program;

(b.1) wherein said obtaining step (b) is responsive to the determination made by said step (g).

11. The machine-implemented method of claim 8 wherein said obtaining step (b) includes the substep of:

(b.1) using a stack walking process to try to identify a stack frame in said stack, where the identified stack frame contains said special value of said return address, wherein the stack walking process moves through a chain of EBP-holding cells defined in said stack of the frozen application program.

12. The machine-implemented method of claim 8 wherein said obtaining step (b) includes the substep of:

(b.1) using a stack scanning process to try to identify a stack frame in said stack, where the identified stack frame contains said special value of said return address, wherein the stack scanning process moves through sequential cells of said stack of the frozen application program.

13. The machine-implemented method of claim 11 wherein if said substep (b.1) of using a stack walking process fails to identify a stack frame containing said special value, then the method continues by trying to identify a stack frame containing said special value by a process of scanning through said stack, wherein the stack scanning process moves through sequential cells of said stack of the frozen application program.

14. The machine-implemented method of one of claims 11 and 13 and further comprising the step of:

(g) determining a size value where said size value defines a relative distance in said stack between a first stack cell representing a start of a stack frame declared by the standard calling function and a second stack cell in said stack that contains said special return address.

15. The machine-implemented method of claim 14 wherein said use of the stack walking process comprises the steps of:

(b.2) pointing a current base pointer to a current top of the virtual stack used by the frozen application program;

(i) determining by way of the current base pointer, a first address for a next lower stack frame associated with the stack location pointed to by the current base pointer;

(ii) combining said first address and said size value to obtain a second address;

(iii) testing a value stored at said second address of said stack for a match with said special value of said return address;

(iv) determining that a most recent location in said stack of the frozen application program has been found corresponding to the most recent use by the frozen application program of the standard calling function, said determining occurring when said testing indicates that said value in second address is equal to said special return address;

(v) replacing the value of said current base pointer with a next base-holding address stored at said first address when said value in second address is not equal to said special return address; and (vi) returning to step (ii).

16. A machine-implemented method for unwinding execution of an identified one of multitasked programs running under a multitasking operating system, where for each respective multitasked program running under said OS (operating system), the OS provides a respective virtual processor that includes a virtual stack and a plurality of respective context registers for supporting multitasking, said context registers including an instruction pointer for keeping track of what instruction the multitasked program is next to execute when its execution resumes during multitasking, and a stack pointer for keeping track of what location in its virtual stack the multitasked program is next to reference as its top-of-stack when its execution resumes during multitasking, where said OS further provides a standard-for-type calling function for use by each given one of the multitasked programs when that given multitasked program is about to invoke a callable, target function of a corresponding type, and where said standard calling function consistently within said OS, places a special return address value on the virtual stack of a given program for returning from a respectively invoked target function of the corresponding type after the given program uses the standard-for-type calling function to invoke the respective target function;

said execution unwinding method comprising the steps of:

(a) identifying the special return address value that is consistently placed on the virtual stack of a given program by the standard-for-type calling function as that standard calling function calls a corresponding target function requested by the given program;

(b) attempting to locate within the virtual stack of the identified program, a stack cell storing the special return address value; and (c) if said attempt to locate is successful, modifying at least the instruction pointer and the stack pointer of the context registers of the identified program to a state said instruction and stack pointers would next be in if the respective target function of the identified program completes successfully and returns by using the special return address value stored in said located cell.

17. The machine-implemented, execution unwinding method of claim 16 wherein:

said OS manipulates windows, including passing messages to said windows; and said standard-for-type calling function is a Window-procedure calling function for calling a corresponding Window-procedure type of target function.

18. The machine-implemented, execution unwinding method of claim 16 wherein:

said context registers of each multitasked program further include a base pointer for keeping track of what location in its virtual stack the multitasked program is next to use as a relative addressing base when its execution resumes during multitasking; and the execution unwinding method further includes the step of:

(d) if said attempt to locate is successful, modifying the base pointer of the context registers of the identified program to a state said base pointer would next be in if the respective target function of the identified program completes successfully and returns by using the special return address value stored in said located cell.

19. The machine-implemented, execution unwinding method of claim 18 wherein:

said context registers of each multitasked program include at least one more register for keeping track of a state the multitasked program is next to be in when its execution resumes during multitasking; and the execution unwinding method further includes the step of:

(e) if said attempt to locate is successful, modifying the at least one more register of the context registers of the identified program to a condition said one more register would next be in if the respective target function of the identified program completes successfully and returns by using the special return address value stored in said located cell.

20. The machine-implemented, execution unwinding method of claim 18 wherein:

each called function of said corresponding type reserves space for itself on the virtual stack of the multitasked program that invokes the called function by declaring a stack frame;

said step of declaring a stack frame includes pushing onto the stack an old value of the base pointer before modifying said base pointer; and the step (b) of attempting to locate a stack cell storing the special return address value further includes the substep of:

(b.1) walking down by stack frames of the stack using a chain of stack cells storing said pushed-onto-the-stack old values of the base pointer as guides for said process of walking down by stack frames.

21. The machine-implemented, execution unwinding method of claim 20 wherein:

said standard-for-type calling function consistently declares for itself a stack frame of a predefined size;

said standard-for-type calling function consistently pushes a predefined number of input parameters onto the stack after declaring for itself said stack frame of the predefined size and just before calling the respective target function that will use said predefined number of input parameters, thereby causing there to be a consistent offset, in terms of same number of cells, between the base of the stack frame declared by the standard-for-type calling function and the place on the stack where the special return address value is stored as the standard-for-type calling function calls the respective target function; and step (b) of attempting to locate a stack cell storing the special return address value further includes the substep of:

(b.2) using the consistent offset to identify within each of the walked-through stack frames, the cell which should, if at all contain an authentic version of said special return address value.

22. The machine-implemented, execution unwinding method of claim 21 wherein, if said process of walking down by stack frames does not succeed in locating an authentic version of said special return address value, said step (b) of attempting to locate further includes the substep of:

(b.3) scanning up cell by cell from the bottom of the virtual stack of the identified program searching for the first occurrence of a cell containing said special return address value.

23. The machine-implemented, execution unwinding method of claim 16 wherein:

said identified program is one which is has been identified as not responding to messages sent from the OS and is therefore a frozen program.

24. The machine-implemented, execution unwinding method of claim 23 wherein if the identified, frozen program is not yet stopped, the method further includes the step of:

(d) causing multitasked execution of the frozen program to stop before said step (b) of attempting to locate is carried out.

25. The machine-implemented, execution unwinding method of claim 24 and further includes the step of:

(e) causing multitasked execution of the frozen program to resume after said step (c) of modifying the context registers is carried out.

26. The machine-implemented, execution unwinding method of claim 24 and further comprising the steps of:

(e) initiating execution of a second multitasked program that has assigned thereto a second virtual stack separate from the virtual stack of the frozen program; and (f) determining within said execution of the second multitasked program what special return address value the standard-for-type calling function consistently places on the stack.

27. The machine-implemented, execution unwinding method of claim 26 wherein:

said standard-for-type calling function consistently declares for itself a stack frame of a predefined size;

said standard-for-type calling function consistently pushes a predefined number of input parameters onto the stack after declaring for itself said stack frame of the predefined size and just before calling the respective target function that will use said predefined number of input parameters, thereby causing there to be a consistent offset, in terms of same number of cells, between the base of the stack frame declared by the standard-for-type calling function and the place on the stack where the special return address value is stored as the standard-for-type calling function calls the respective target function; and the execution unwinding method further comprising the step of:

(g) determining within said execution of the second multitasked program what consistent offset the standard-for-type calling function consistently uses.

28. The machine-implemented, execution unwinding method of claim 27 wherein:

said steps (f) and (g) of determining the special return address value and the consistent offset are carried out by having the second multitasked program invoke a dummy target function using the standard-for-type calling function and thereafter examining, within said execution of the second multitasked program what special return address value and offset have consequently developed in the second virtual stack.

29. A computing machine having a multitasking operating system (OS) and an ability to unwind execution of an identified one of multitasked programs running under the multitasking operating system, wherein for each respective multitasked program running under said OS, the OS provides a respective virtual processor that includes a virtual stack and a plurality of respective context registers for supporting multitasking, said context registers including an instruction pointer for keeping track of what instruction the multitasked program is next to execute when its execution resumes during multitasking, and a stack pointer for keeping track of what location in its virtual stack the multitasked program is next to reference as its top-of-stack when its execution resumes during multitasking, wherein said OS further provides a standard-for-type invoking function for use by each given one of the multitasked programs when that given multitasked program is about to invoke a target function of a corresponding type, and where said standard-for-type invoking function consistently within said OS, places a special signature on the virtual stack of the given program that uses said standard-for-type invoking function to respectively invoke a given target function of the corresponding type;

said computing machine comprising:

(a) an automated identifier for identifying the special signature that is consistently placed on the virtual stack of each given program by the standard-for-type invoking function as the invoking function executes within said machine;

(b) an automated searcher which is responsive to the special signature identified by said identifier, where the searcher searches the virtual stack of the identified program to locate a stack cell storing the special signature; and (c) an automated context modifier which, in response to said searcher successfully locating the special signature, modifies at least the instruction pointer and the stack pointer of the context registers of the identified program to a state that the instruction and stack pointers would next be in if the respectively invoked target function of the identified program completes successfully.

30. The computing machine of claim 29 wherein:

said standard-for-type invoking function calls the target function in order to invoke the target function; and said special signature is a return address value which is placed on the virtual stack of the identified program as the invoking function calls the target function.

31. The computing machine of claim 30 wherein:

said OS manipulates windows, including passing messages to said windows; and said standard-for-type invoking function is a Window-procedure calling function for calling a corresponding Window-procedure type of target function.

32. The computing machine of claim 29 wherein:

said context registers of each multitasked program include at least one more register for keeping track of a state the multitasked program is next to be in when its execution resumes during multitasking; and (c.1) in response to said searcher successfully locating the special signature, said automated context modifier further modifies the at least one more register of the context registers of the identified program to a state that the at least one more register would next be in if the respectively invoked target function of the identified program completes successfully.

33. The computing machine of claim 32 wherein the at least one more register is a a base pointer which is used for keeping track of what location in its virtual stack the multitasked program is next to use as a relative addressing base when its execution resumes during multitasking.

34. The computing machine of claim 33 wherein:

the standard-for-type invoking function and each invoked target function of said corresponding type reserves space for itself on the virtual stack of the multitasked program that invokes the target function by declaring a stack frame;

said step of declaring a stack frame includes pushing onto the stack an old value of the base pointer before modifying said base pointer; and (b.1) said automated searcher performs a process of walking down the stack of the identified program in steps constituted by stack frames, where the walking down process uses a chain of stack cells storing said pushed-onto-the-stack old values of the base pointer as guides for said process of walking down the stack.

35. The computing machine of claim 34 wherein:

said standard-for-type invoking function consistently declares for itself a stack frame of a predefined size;

said standard-for-type invoking function consistently pushes a predefined number of parameters onto the stack after declaring for itself said stack frame of the predefined size and just before the special signature is placed on the stack, thereby causing there to be a consistent offset, in terms of same number of cells, between the base of the stack frame declared by the standard-for-type invoking function and the place on the stack where the special signature is stored; and (b.2) said automated searcher uses the consistent offset to identify within each of the walked-through stack frames, the cell which should, if at all contain an authentic version of said special signature.

36. The computing machine of claim 34 wherein:

(b.3) if said automated searcher fails to locate the special signature during the process of walking down the stack, the automated searcher further tries to locate the special signature by scanning up cell by cell from the bottom of the virtual stack of the identified program searching for the first occurrence of a cell containing said special signature.

37. The computing machine of claim 36 wherein:

said identified program is one which is has been identified as not responding to messages sent from the OS and is therefore a frozen program.

38. The computing machine of claim 37 further comprising (d) an automated stopper for causing multitasked execution of the frozen program to stop before the automated searcher begins searching if the identified, frozen program is not yet stopped.

39. A computing machine having a multitasking operating system (OS) and an ability to unwind execution of an identified one of multitasked programs running under the multitasking operating system, wherein for each respective multitasked program running under said OS, the OS provides a respective virtual processor that includes a virtual stack and a plurality of respective context registers for supporting multitasking, said context registers including an instruction pointer for keeping track of what instruction the multitasked program is next to execute when its execution resumes during multitasking, and a stack pointer for keeping track of what location in its virtual stack the multitasked program is next to reference as its top-of-stack when its execution resumes during multitasking, wherein said OS further provides a standard-for-type calling function for use by each given one of the multitasked programs when that given multitasked program is about to invoke a callable, target function of a corresponding type, and where said standard calling function consistently within said OS, places a special return address value on the virtual stack of a given program for returning from a respectively invoked target function of the corresponding type after the given program uses the standard-for-type calling function to invoke the respective target function;

said computing machine comprising:

(a) identifying means for identifying the special return address value that is consistently placed on the virtual stack of a given program by the standard-for-type calling function as that standard calling function calls a corresponding target function requested by the given program;

(b) searching means for attempting to locate within the virtual stack of the identified program, a stack cell storing the special return address value; and (c) context modifying means for determining whether said searching means was successful in its attempt to locate the special return address value, and if so, for modifying at least the instruction pointer and the stack pointer of the context registers of the identified program to a state said instruction and stack pointers would next be in if the respective target function of the identified program completes successfully and returns by using the special return address value stored in said located cell.

40. A manufactured, instructing signal for instructing a predefined computing machine to perform an execution unwinding operation on an identified program, where the computing machine has a multitasking operating system (OS) and the identified program is one of plural multitasked programs running under the multitasking operating system, wherein for each respective multitasked program running under said OS, the OS provides a respective virtual processor that includes a virtual stack and a plurality of respective context registers for supporting multitasking, said context registers including an instruction pointer for keeping track of what instruction the multitasked program is next to execute when its execution resumes during multitasking, and a stack pointer for keeping track of what location in its virtual stack the multitasked program is next to reference as its top-of-stack when its execution resumes during multitasking, wherein said OS further provides a standard-for-type invoking function for use by each given one of the multitasked programs when that given multitasked program is about to invoke a target function of a corresponding type, and where said standard-for-type invoking function consistently within said OS, places a special signature on the virtual stack of the given program that uses said standard-for-type invoking function to respectively invoke a given target function of the corresponding type;

said instructing signal instructing the computing machine to perform a set of operations comprising:

(a) identifying the special signature that is consistently placed on the virtual stack of each given program by the standard-for-type invoking function as the invoking function executes within said machine;

(b) in response to the special signature being identified by said identifying operation, searching the virtual stack of the identified program to locate a stack cell storing the special signature; and (c) in response to said searching successfully locating the special signature, modifying at least the instruction pointer and the stack pointer of the context registers of the identified program to a state that the instruction and stack pointers would next be in if the respectively invoked target function of the identified program completes successfully.

41. The manufactured, instructing signal of claim 40 wherein:

said standard-for-type invoking function calls the target function in order to invoke the target function; and said special signature is a return address value which is placed on the virtual stack of the identified program as the invoking function calls the target function.

42. The manufactured, instructing signal of claim 41 wherein:

said OS manipulates windows, including passing messages to said windows; and said standard-for-type invoking function is a Window-procedure calling function for calling a corresponding Window-procedure type of target function.

43. The manufactured, instructing signal of claim 40 wherein:

said context registers of each multitasked program include at least one more register for keeping track of a state the multitasked program is next to be in when its execution resumes during multitasking; and (c.1) said instructed modifying operation further modifies the at least one more register of the context registers of the identified program to a state that the at least one more register would next be in if the respectively invoked target function of the identified program completes successfully.

44. The manufactured, instructing signal of claim 43 wherein the at least one more register is a a base pointer which is used for keeping track of what location in its virtual stack the multitasked program is next to use as a relative addressing base when its execution resumes during multitasking.

45. The manufactured, instructing signal of claim 44 wherein:

the standard-for-type invoking function and each invoked target function of said corresponding type reserves space for itself on the virtual stack of the multitasked program that invokes the target function by declaring a stack frame;

said step of declaring a stack frame includes pushing onto the stack an old value of the base pointer before modifying said base pointer; and (b.1) said instructed searching operation includes walking down the stack of the identified program in steps constituted by stack frames, where the walking down process uses a chain of stack cells storing said pushed-onto-the-stack old values of the base pointer as guides for said process of walking down the stack.

46. The manufactured, instructing signal of claim 45 wherein:

said standard-for-type invoking function consistently declares for itself a stack frame of a predefined size;

said standard-for-type invoking function consistently pushes a predefined number of parameters onto the stack after declaring for itself said stack frame of the predefined size and just before the special signature is placed on the stack, thereby causing there to be a consistent offset, in terms of same number of cells, between the base of the stack frame declared by the standard-for-type invoking function and the place on the stack where the special signature is stored; and (b.2) said instructed searching operation uses the consistent offset to identify within each of the walked-through stack frames, the cell which should, if at all contain an authentic version of said special signature.

47. The manufactured, instructing signal of claim 45 wherein:

(b.3) if said instructed searching operation fails to locate the special signature by walking down the stack, the instructed searching operation further attempts to locate the special signature by scanning up cell by cell from the bottom of the virtual stack of the identified program searching for the first occurrence of a cell containing said special signature.

48. The manufactured, instructing signal of claim 47 wherein:

said identified program is one which is has been identified as not responding to messages sent from the OS and is therefore a frozen program.

49. The manufactured, instructing signal of claim 48 which instructs the computing machine to perform a further operation of:

(d) causing multitasked execution of the frozen program to stop before the searching begins if the identified, frozen program is not yet stopped.

50. A computer-readable medium for instructing a predefined computing machine to perform an execution unwinding operation on an identified program, where the computing machine has a multitasking operating system (OS) and the identified program is one of plural multitasked programs running under the multitasking operating system, wherein for each respective multitasked program running under said OS, the OS provides a respective virtual processor that includes a virtual stack and a plurality of respective context registers for supporting multitasking, said context registers including an instruction pointer for keeping track of what instruction the multitasked program is next to execute when its execution resumes during multitasking, and a stack pointer for keeping track of what location in its virtual stack the multitasked program is next to reference as its top-of-stack when its execution resumes during multitasking, wherein said OS further provides a standard-for-type invoking function for use by each given one of the multitasked programs when that given multitasked program is about to invoke a target function of a corresponding type, and where said standard-for-type invoking function consistently within said OS, places a special signature on the virtual stack of the given program that uses said standard-for-type invoking function to respectively invoke a given target function of the corresponding type;

said computer-readable medium instructing the computing machine to perform a set of operations comprising:

(a) identifying the special signature that is consistently placed on the virtual stack of each given program by the standard-for-type invoking function as the invoking function executes within said machine;

(b) in response to the special signature being identified by said identifying operation, searching the virtual stack of the identified program to locate a stack cell storing the special signature; and (c) in response to said searching successfully locating the special signature, modifying at least the instruction pointer and the stack pointer of the context registers of the identified program to a state that the instruction and stack pointers would next be in if the respectively invoked target function of the identified program completes successfully.

* * * * *